United States Patent Office 2,860,035
Patented Nov. 11, 1958

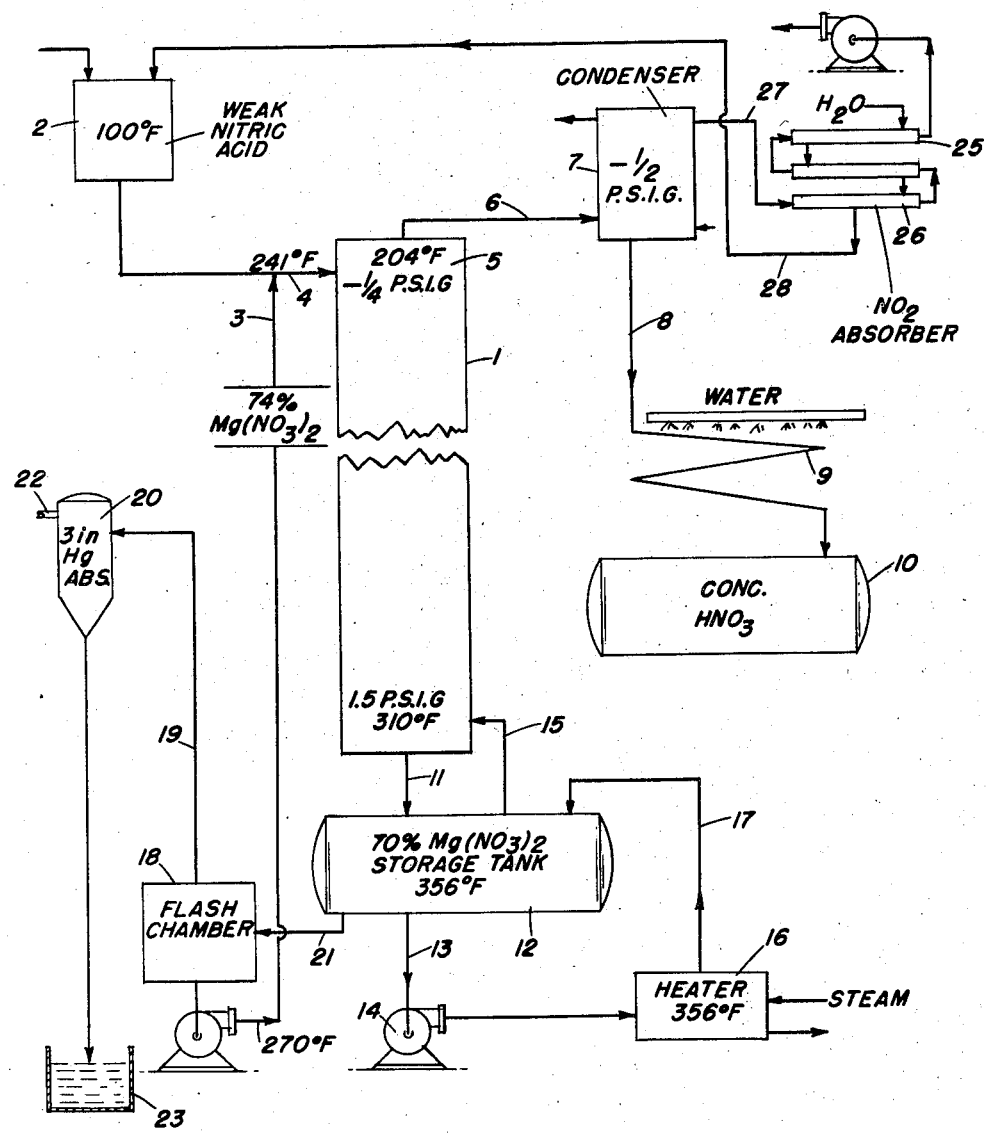

2,860,035
PRODUCTION OF HIGHLY CONCENTRATED NITRIC ACID

Bernard G. Mandelik, Pleasantville, N. Y., assignor to Chemical Construction Corporation, New York, N. Y., a corporation of Delaware Application March 28, 1956, Serial No. 574,491

4 Claims. (Cl. 23—160)

This invention relates to a process for the production of highly concentrated nitric acid from aqueous nitric acid of the strength ordinarily obtained from commercial nitric acid plants by flash distillation of a preheated mixture of the dilute nitric acid with aqueous magnesium nitrate solution.

Several methods of concentrating nitric acid have been proposed in which magnesium nitrate is used as a dehydrating agent. It is a well known fact that nitric acid of high concentrations cannot be obtained by ordinary distillation and rectification processes since an azeotrope containing about 67% nitric acid and 33% water is formed; the addition of magnesium nitrate avoids this azeotrope formation and permits the production of a vapor mixture containing about 87% nitric acid and 13% of water vapor. In order to obtain more highly concentrated nitric acid, however, this vapor mixture must be rectified by fractional distillation using part of the condensed product acid as reflux, usually with reflux ratios of about 2:1 or greater.

Experience has shown that the repeated refluxing of strong nitric acid in such rectification processes causes extensive decomposition of the acid to oxides of nitrogen which must be converted into weak nitric acid by absorption in water. It is a principal object of the present invention to provide a concentrating process wherein weak nitric acid is converted into highly concentrated product acid by a flash distillation procedure from which vaporized nitric acid having a very low content of water vapor is obtained directly. By this procedure the necessity for returning part of the strong acid to a fractionating column as reflux is eliminated, and excessive losses through decomposition of this acid into oxides of nitrogen are avoided.

A further advantage of the invention resides in the fact that the apparatus wherein it is carried out is greatly simplified, since no rectification column for the product acid is required. This also avoids the necessity of providing recycle pumps for the strong acid, which in practice are costly to install and maintain. Other objects and advantages of the invention will become apparent from the following description of a preferred embodiment thereof.

My invention is based on the discovery that nitric acid vapors having a very low content of water vapor, and which can be condensed to a product acid of 95–99% $HNO_3$ content if desired, can be produced by flash distilling a preheated mixture of dilute nitric acid and aqueous magnesium nitrate solution when the proportions of magnesium nitrate and water in the mixture are closely controlled. I have found that when the weight ratio of magnesium nitrate to water in such a preheated mixture is approximately 70:30 and the mixture is discharged into a column or other distillation zone maintained at its boiling point the vapors produced will consist almost entirely of nitric acid and only a small percentage of water vapor is evolved.

In its broadest aspects the process of my invention therefore consists essentially in subjecting to flash distillation a mixture of the dilute nitric acid of commerce with a quantity of preheated aqueous magnesium nitrate solution sufficient to produce the necessary 70:30 ratio of magnesium nitrate to water and condensing the resulting vapors. The liquid magnesium nitrate-water mixture from this flash distillation is preferably denitrated by known procedures, as by stripping with steam, and is then concentrated to its original strength for reuse in the process. During the steam stripping and concentration the solution becomes reheated to temperatures sufficiently high to provide the necessary heat for the flash distillation, and thus a continuous operating process is provided.

I have also found, as an important specific feature of my invention, that substantially all of the nitric acid can be vaporized from commercial nitric acids of about 55–67% $HNO_3$ content by flash distillation when the preheated magnesium nitrate is mixed therewith as an aqueous solution of about 73–76% magnesium nitrate content having a temperature within the range of about 260°–280° F. When these concentrations and temperatures are used the weight ratios of real nitric acid, magnesium nitrate and water are such that the flash distillation temperature is about 204° F. and the quantity of sensible heat supplied with the preheated magnesium nitrate solution provides the heat necessary to vaporize substantially all of the nitric acid. In a properly designed process operating on this principle not more than 5% and usually only about 1–3% of the $HNO_3$ in the feed acid is left in the magnesium nitrate solution and only relatively small quantities of stripping steam are needed for its removal.

The invention will be further described with reference to the accompanying drawing, the single figure of which is a flow sheet illustrating a commercial embodiment of the process. On this drawing reference numeral 1 indicates a column into which weak nitric acid from feed tank 2 and preheated 74% magnesium nitrate from line 3 are introduced through line 4. An equilibrium temperature of about 204° F. is automatically maintained in the top section 5 of the column, this being the temperature at which 95–99% nitric acid vapors are boiled from the feed mixture by flash distillation, and these vapors are drawn off through a line 6 and condensed in a water cooled condenser 7. The resulting concentrated nitric acid, which may be of 95–99% strength, is drawn off through line 8 and cooled in cooling coils 9 and is then collected in a product acid storage tank 10.

The column 1 is a stripping column of conventional type and may contain either a metallic packing or bubble plates or other gas and liquid contact elements; in a full-scale commercial plant it is usually about 80–90 feet high. The unvaporized portion of the feed mixture flows down this column in countercurrent contact with steam admitted through line 15 and is stripped of residual nitric acid which becomes vaporized and passes into the condenser 7. The stripped magnesium nitrate solution flows through line 11 into a reboiler tank 12 from which a portion is continuously withdrawn through line 13 and pump 14 and recirculated through a heater 16 provided with closed steam coils and then through return line 17. By this means the solution in the tank 12 is maintained in a boiling condition and steam is evolved which passes through line 15 into the base of the tower 1.

The magnesium nitrate solution in the reboiler tank 12 is usually of about 70% strength and boils at about 356° F. under the pressure existing at the bottom of the tower 1, which is about 1.5 p. s. i. g. This solution is preferably reconcentrated to 74% strength by flash evaporation in a flash chamber 18 connected through an overhead line 19 to a barometric jet condenser 20 operating at about 3 inches mercury absolute. Magnesium nitrate solution from the tank 12, at the temperature prevailing in this tank, flows through line 21 into the flash chamber 18 and is reconcentrated to 74% strength as it is cooled to a desired temperature within the range of 260°–280° F. by the water evaporation. Steam evolved in chamber 18 is condensed in the barometric condenser by sprays of water introduced through line 22 and is recovered in barometric pit 23. The reconcentrated magnesium nitrate solution, having the requisite temperature and concentration for reuse in the process, is returned through line 3 for admixture with additional quantities of feed acid from the tank 2.

In the process of my invention the concentrated nitric acid vapors from the flash distillation are condensed directly as product acid, and none of this acid is returned to the column 1 as reflux. For this reason there is little loss of strong nitric acid through decomposition into oxides of nitrogen. However there is always some decomposition in any process in which highly concentrated nitric acid is boiled, and therefore a recovery system 25 is provided. This system preferably consists of a series of horizontal pipes 26 through which a flow of water is passed; the uncondensed gases from the condenser 7 are introduced into this pipe system through line 27 and are stripped of oxides of nitrogen by absorption in the water. The resulting weak nitric acid is returned through line 28 to the storage tank 2 for admixture with the feed acid to the concentrating process.

The important commercial advantages of the invention are apparent from the above description. By utilizing aqueous magnesium nitrate solution in the quantities and concentrations indicated a highly concentrated nitric acid product is obtained without the necessity of reflux in a fractionating column with a substantial reduction in losses through decomposition into oxides of nitrogen and with a corresponding simplification of the equipment. Practically all of the nitric acid content of the feed is evaporated by the flash distillation and the small quantity remaining in the magnesium nitrate solution can be removed with only a small consumption of stripping steam. The 70% magnesium nitrate solution obtained from the flash distillation has a boiling point such that it can readily be reconcentrated to 73–76% strength by vacuum concentration under a vacuum that is readily obtainable in an ordinary barometric jet condenser while being cooled to a temperature within the range of 260°–280° F. When the reconcentrated magnesium nitrate solution of this temperature is mixed with further quantities of weak nitric acid it supplies the heat necessary for the flash distillation of the mixture, and therefore the process is self-regulating in continuous commercial operation.

The invention will be further described and illustrated by the following specific example to which, however, it is not limited.

*Example*

For each 1000 lbs. of 60% aqueous nitric acid from the feed tank 2 there is supplied 7000 lbs. of 74% aqueous magnesium nitrate solution at 270° F. from the flash chamber 18. The resulting mixture, at a temperature of 241° F., is introduced through line 4 into the column 1 where 99% nitric acid flashes off at a temperature of 204° F. and pressure of 14.45 lbs. per square inch absolute. The vapors are drawn off through line 6 into a water-cooled condenser 7 where they are condensed. By this procedure approximately 550 lbs. of real nitric acid is recovered in the line 8 as a product acid of about 95–99% strength. This acid is cooled in the pipe cooler 9 and collected in the storage tank 10.

Uncondensed oxides of nitrogen are withdrawn from the condenser 7 through line 27 and are contacted with water in the absorber 25. By this procedure approximately 75 lbs. of 60% nitric acid are recovered and are returned through line 28 to the feed tank.

The remainder of the feed mixture passes down the column 1 in contact with steam, which strips off residual nitric acid, and is finally collected in the reboiler tank 12. The 70% magnesium nitrate solution in this tank, weighing 7,395 lbs., is maintained in a boiling condition by closed steam coils in the heater 16 and the steam so generated is introduced into the base of the tower through line 15. Fourteen hundred (1400) pounds of saturated steam at 300 p. s. i. g. are used in the heater 16.

The 70% magnesium nitrate solution is reconcentrated to 74% strength by passing it through line 21 into the flash chamber 18, which is maintained under reduced pressure by the barometric jet condenser 20 operating at about 3 mm. mercury absolute, and is then returned through line 3 for admixture with more feed acid.

What I claim is:

1. A method of producing highly concentrated nitric acid from a dilute nitric acid of about 55–67% $HNO_3$ content while avoiding extensive decomposition thereof to oxides of nitrogen which comprises preparing a preheated mixture of said dilute acid with aqueous magnesium nitrate solution of about 73–76% $MgNO_3$ content having a temperature of about 260°–280° F. in proportions such as to produce therein a weight ratio of magnesium nitrate to water of about 70:30, flash distilling said preheated mixture by discharging it into the upper part of a distillation zone maintained at the boiling point of a 95–99% nitric acid and thereby forming vaporized nitric acid having a low content of water vapor, and drawing off and condensing said vaporized nitric acid.

2. A method of producing highly concentrated nitric acid from a dilute nitric acid of about 60% $HNO_3$ content while avoiding extensive decomposition thereof to oxides of nitrogen which comprises mixing said acid with an aqueous 74% magnesium nitrate solution having a temperature of about 260°–280° F. in a weight of about 1 to 7, flash distilling the resulting mixture by discharging it into the upper part of a distillation zone maintained at the boiling point of a 95–99% nitric acid and thereby forming vaporized nitric acid having a low content of water vapor, and drawing off and condensing said vaporized nitric acid.

3. A method of producing highly concentrated nitric acid from a dilute nitric acid of about 55–67% $HNO_3$ content while avoiding extensive decomposition thereof to oxides of nitrogen which comprises mixing said acid with aqueous 73–76% magnesium nitrate having a temperature of about 260°–280° F. in proportions such as to obtain a mixture having a weight ratio of magnesium nitrate to water of about 70 to 30, flash distilling said mixture by discharging it into the upper part of a column maintained at the boiling point of a 95–99% nitric acid and thereby forming vaporized nitric acid having a low content of water vapor, drawing off and condensing said vaporized nitric acid as product acid, stripping residual nitric acid from the remaining magnesium nitrate solution by passing it down said column in countercurrent contact with steam, reconcentrating the stripped solution to 73–76% magnesium nitrate content by vacuum evaporation of water therefrom and returning it for admixture with further quantities of nitric acid.

4. A method of producing highly concentrated nitric acid from a dilute nitric acid of about 55–67% $HNO_3$ content while avoiding extensive decomposition thereof to oxides of nitrogen which comprises mixing said acid with aqueous 73–76% magnesium nitrate having a temperature of about 260°–280° F. in proportions such as to obtain a mixture having a weight ratio of magnesium nitrate to water of about 70 to 30, flash distilling said mixture by discharging it into the upper part of a column maintained at the boiling point of a 95–99% nitric acid and thereby forming vaporized nitric acid having a low content of water vapor, drawing off and condensing said vaporized nitric acid as product acid, stripping residual nitric acid from the remaining magnesium nitrate solution by passing it down said column in countercurrent contact with steam obtained by boiling the stripped magnesium nitrate solution, reconcentrating the boiling solution to 73–76% magnesium nitrate content and simultaneously cooling it to 260°–280° F. by vacuum evaporation of water therefrom and returning it for admixture with further quantities of nitric acid.

References Cited in the file of this patent

UNITED STATES PATENTS

| | | |
|---|---|---|
| 2,463,453 | Beardsley | Mar. 1, 1949 |
| 2,716,631 | Bechtel | Aug. 30, 1955 |